United States Patent
Pickering et al.

(10) Patent No.: US 7,298,763 B2
(45) Date of Patent: *Nov. 20, 2007

(54) MANAGING BANDWIDTH ON DEMAND FOR INTERNET PROTOCOL MESSAGING WITH CAPABILITY FOR TRANSFORMING TELEPHONY CALLS FROM ONE MEDIA TYPE TO ANOTHER MEDIA TYPE

(75) Inventors: Richard B Pickering, El Granada, CA (US); Douglas Gisby, Foster City, CA (US)

(73) Assignee: Genesys Telecommunications Laboratories, Inc, Daly City, CA (US)

( * ) Notice: Subject to any disclaimer, the term of this patent is extended or adjusted under 35 U.S.C. 154(b) by 967 days.

This patent is subject to a terminal disclaimer.

(21) Appl. No.: 10/676,971

(22) Filed: Sep. 30, 2003

(65) Prior Publication Data

US 2004/0062250 A1    Apr. 1, 2004

Related U.S. Application Data

(62) Division of application No. 09/050,673, filed on Mar. 30, 1998, now Pat. No. 6,628,666.

(51) Int. Cl.
*H04L 12/28* (2006.01)
(52) U.S. Cl. ............ 370/468; 370/270; 370/352; 370/395.21; 370/465; 379/265.05
(58) Field of Classification Search ........... 370/270, 370/352, 468; 379/265.05
See application file for complete search history.

(56) References Cited

U.S. PATENT DOCUMENTS 6,363,079 B1 *  3/2002  Barzegar et al. ............ 370/465
6,628,666 B1 *  9/2003  Pickering et al. ........... 370/468

OTHER PUBLICATIONS

U.S. Appl. No. 09/050,673, filed Mar. 30, 1998, Richard Pickering et al.

* cited by examiner

*Primary Examiner*—Seema S. Rao
*Assistant Examiner*—Henry Baron
(74) *Attorney, Agent, or Firm*—Donald R. Boys; Central Coast Patent Agency, Inc.

(57) ABSTRACT

A system for assuring quality-of service for Data Network Telephone (DNT) calls, such as Internet Protocol Network Telephony (IPNT) calls has software for monitoring established DNT calls for adequate bandwidth. A threshold bandwidth, or parameter value related to bandwidth is stored, and tests are periodically made on the DNT call path and compared to the threshold. If the available bandwidth falls below the threshold, an alternative conventional call, such as a PSTN or ISDN call is made to replace the DNT call. Once the alternative call is established, the original call is ended. After the original call is ended, tests of the DNT path continue, and, in some cases, if adequate DNT bandwidth becomes available, the call is switched back to DNT. In some cases, alerts are posted for call participants, and provision is made for approval by one or both participants in a call for a switch in service type to be made.

5 Claims, 2 Drawing Sheets

MANAGING BANDWIDTH ON DEMAND FOR INTERNET PROTOCOL MESSAGING WITH CAPABILITY FOR TRANSFORMING TELEPHONY CALLS FROM ONE MEDIA TYPE TO ANOTHER MEDIA TYPE

CROSS-REFERENCE TO RELATED DOCUMENTS

The present application is a divisional application of co-pending patent application Ser. No. 09/050,673 entitled "Managing Bandwidth on Demand for Internet Protocol Messaging with Capability for Transforming Telephony Calls from One Media Type to Another Media Type", which was filed on Mar. 30, 1998, now U.S. Pat. No. 6,628,666 and which is incorporated herein in its entirety.

FIELD OF THE INVENTION

The present invention is in the field of Telephony communications and has particular application to methods including software for transforming the media type of a telephony call while it is still in progress as a means of assuring adequate bandwidth for the call.

BACKGROUND OF THE INVENTION

Telephone call processing and switching systems are, at the time of the present patent application, relatively sophisticated, computerized systems, and development and introduction of new systems continues. Much information on the nature of such hardware and software is available in a number of publications accessible to the present inventor and to those with skill in the art in general. For this reason, much minute detail of known systems is not reproduced here, as to do so would obscure the facts of the invention.

One document which provides considerable information on intelligent networks is "ITU-T Recommendation Q.1219, Intelligent Network User's Guide for Capability Set 1", dated April, 1994.

At the time of filing the present patent application there continues to be remarkable growth in telephone-based information systems (intelligent networks) including Internet based systems. Recently emerging examples are telemarketing operations and technical support operations, among many others, which have grown apace with development and marketing of, for example, sophisticated computer equipment. More traditional are systems for serving customers of such as large insurance organizations. In some cases, organizations develop and maintain their own telephony operations with purchased or leased equipment, and in many other cases, companies are outsourcing such operations to firms that specialize in such services.

A large technical support operation may serves as an example of some of the kinds of applications of telephone equipment and functions to which the present invention pertains and applies. Consider such a system having a country-wide matrix of call-in centers, which is more and more a relatively common practice to provide redundancy and decentralization, which are often considered desirable in such operations. Also in such large organizations, business firms have a national, and in many cases a world-wide customer base. Such a system handles a large volume of calls from people seeking technical information on, for example, installation of certain computer-oriented equipment. These calls are handled by a finite number of trained operators distributed over the decentralized matrix of call centers.

In an intelligent network such as described above, incoming calls placed from anywhere in the Public Switch Telephone Network (PSTN) arrive at central telephony switches called Service Control Points (SCP). An SCP is generally provided to be relatively close to a defined local area of callers. If the intelligent network is very large comprising many call centers then more than one SCP may be provided. Routing of incoming calls begins at the SCP.

A central router at the SCP routes incoming calls to other routers or telephony switches that are deployed throughout the network to provide further routing to call centers or customer information systems (CIS). Additional processors may be provided at the SCP for further computer enhancement. For example, when a call arrives at the SCP, information about the caller is collected and processed to help determine the final destination of the call. Then according to programmed routing rules, the call may be routed to an automatic call distributor (ACD) for further routing to a call center and then on to an available agent. In some networks (known to the inventor) digital information pertaining to the caller may arrive at an agent station before the analog call. Routing in an intelligent network may be accomplished on several levels according to many different protocols. It is the processor connected to the telephony switch that provides computer enhancement in an intelligent network.

More recently, there has been an integration between intelligent call processing systems and the public wide area network known as the Internet. A call center that is connected to both a public or private telephony network and the Internet can receive calls from either source. In an environment such as this, multimedia forms of communication may also be received such as E-mail, Internet phone calls, video calls and so on. An agent operating at a station equipped with an Internet connected PC as well as a public switch connected telephone can communicate using a wide variety of tools.

Internet-based telephony systems may utilize both a regular telephony network and the Internet backbone, as briefly described above, or be based exclusively on the Internet. The present invention pertains most particularly to those systems which rely on both intelligent telephony networks and the Internet, and may handle calls over either network. Therefore, in addition to CTI equipment normally applied to, for example, a publicly switched Telephony network, there are Internet connected processors adapted for the routing and processing of calls according to Internet Protocol (IP), as is known in the art.

The added capability of routing telephone calls over digital networks such as the Internet, and the additional communication options available to an Internet-connected call center can enhance a company's ability to reach a large market as well as to service customers efficiently. Because of the shared nature inherent to portions of Internet infrastructure and Telephony infrastructure, the line separating the two mediums is often somewhat ill-defined. For example, traffic from Internet activity may share certain sections of infrastructure that are used for public telephony traffic, and so on.

One of the challenges faced with adapting real-time communication to being carried over a wide area network (WAN) such as the Internet, concerns available bandwidth. For example, a conventional (non-Internet) call to a call center arrives on dedicated lines that guarantee the bandwidth needed for the call. Any congestion issues regarding traffic in the network are typically handled with intelligent routing solutions. Connected digital networks such as local area network (LAN) or (WAN) share available bandwidth and are mostly utilized, in current art, for transferring information associated with a call, requesting routing of a call, controlling telephony switches, and so on. This state, as previously described, is not due to a lack of capability of transferring a real-time transaction over a digital network, but rather, to the uncertainty of available bandwidth during periods of high congestion in the network. For example, if a real-time transaction such as a telephone call is experiencing a drop in available bandwidth below a certain level, the call can break up or be delayed beyond a reasonable time rendering the transaction obsolete. Furthermore, real-time transactions being transported across a WAN such as the Internet require more bandwidth than other types of transactions that share the network. Because bandwidth is shared over a WAN, various uses must compete for available bandwidth. Portions of the Internet experience heavy congestion during certain times of the day, for example, raising the risk of the loss of real-time transactions to an Internet-connected call center.

Adaptive encoding techniques have been proposed to enable better real-time service during periods of high congestion on the Internet. These encoding techniques attempt to adapt transactions to lower Bandwidth thresholds that may occur along the path or route used during the transaction. Other techniques such as resource reservation protocol (RSVP) and real-time transport protocol (RTP) are used to secure bandwidth for a transaction and to insure that proper flow and identification of information is received. Both techniques use existing IP protocol. These techniques can be used in conjunction with, or independently from each other. However, these adaptations are not complete solutions to the problem of transporting real-time communication over a WAN.

What is clearly needed is a method and apparatus including software that enables a system to switch a real-time transaction between different protocols and paths, such as between Internet and ISDN, for example, based on detection and monitoring of available bandwidth as a call progresses. A method such as this could enable real-time transactions to be salvaged and delivered in alternate media form in the event that substantive bandwidth is not available along a certain portion of a WAN or delays are too long with a conventional telephony connection.

SUMMARY OF THE INVENTION

In a preferred embodiment of the present invention, a method for assuring quality of service for Data Network Telephony (DNT), in particular the example of Internet Protocol Network Telephony (IPNT) calls is provided, comprising steps of (a) monitoring bandwidth on an existing IPNT call between two stations; (b) comparing available bandwidth to a prestored threshold value; and (c) in the event that available bandwidth is less than the prestored threshold value, establishing a conventional telephone call via a telephony channel between telephones available to the participants in the IPNT call, and terminating the IPNT call. Bandwidth may be monitored by determining latency between two points, and in this case the prestored threshold value is a latency time value.

In some embodiments the system continues to monitor bandwidth for the IPNT path, and restores the IPNT call and terminates the conventional telephony call in the event that available bandwidth again is equal to or exceeds the prestored threshold value.

In preferred embodiments a single user interface for calls is provided at the stations where calls are completed, and in one case the interface comprises a telephone connected by its speaker line to the input and output of a sound card installed in the computer. None of the discussed aspects is specific to IPNT, but can be applied to DNT in general.

In some embodiments, before a switch of call type or network is made, one or both participants in the call are notified, and in some cases participants are provided with an opportunity to ratify or veto a contemplated switch.

In alternative aspects of the invention, apparatus adapted for practicing the invention is provided, wherein software for accomplishing the invention may be operated on a variety of platforms, depending on system content and connection. In yet other aspects, call center architecture is provided wherein various embodiments of the invention may be practiced.

BRIEF DESCRIPTION OF THE DRAWING FIGURES

DESCRIPTION OF THE PREFERRED EMBODIMENTS

Figure 1:
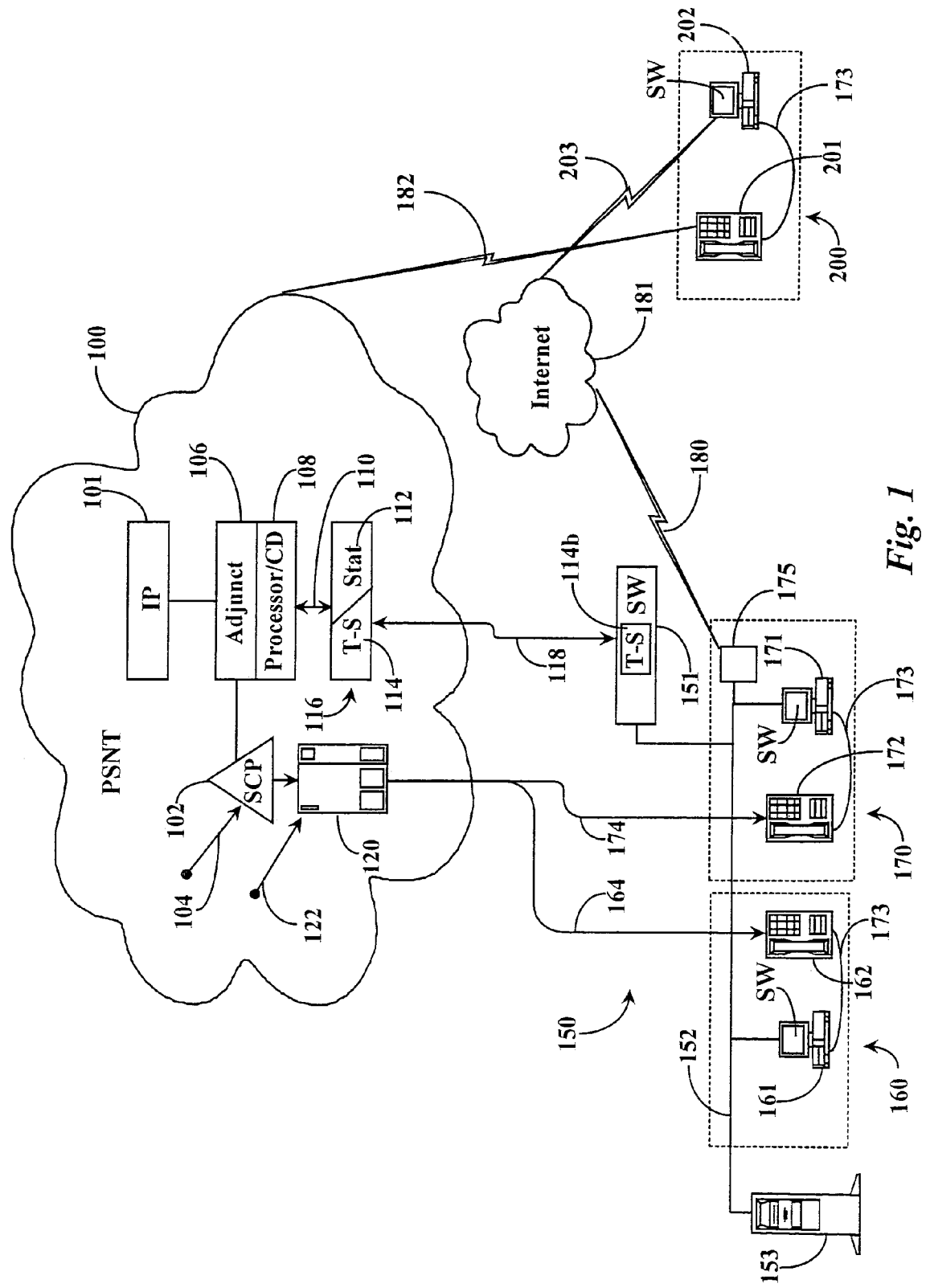
FIG. 1 is an overview of an Internet-based intelligent network according to an embodiment of the present invention.

FIG. 1 is an overview of a messaging system using both the Internet as an example for DNT and a conventional telephony network according to an embodiment of the present invention, wherein bandwidth monitoring and subsequent call method and type exchange is practiced. A call center 150 comprises a LAN-connected agent station 160 and a LAN-connected agent station 170. There may be more than one call center such as call center 150 distributed throughout a network, however one such call center having two agent stations is sufficient for the purpose of adequately describing the present invention.

Agent station 160 comprises a personal computer (PC) 161 and a telephone 162. Agent's telephone 162 is connected to a telephony switch 120 via a conventional telephone channel 164. Telephony switch 120 may be a Publicly Switched Telephony Network (PSTN) switch, a Private Branch Exchange (PBX), or another type of telephony switch known in the art. Agent's telephone 162 in this embodiment is connected to agent's PC 161 via a modular cable 173, such that the speaker line in the telephone is connected to the input and output ports of a sound card coupled to an internal bus of the PC, such that audio at the telephone, on both the microphone and speaker lines, may originate from either the PC or the telephone channel to which the telephone is connected, and audio input at the telephone is transmitted to either or both of the PC and the telephone channel to which the telephone is connected. There are other connections known to the inventor for accomplishing the purpose of allowing a telephone to cooperate with a computer such that the audio on the telephone is shared with the computer by means of analog-to-digital conversion and digital-to-analog conversion.

An input cable connection from the agent's telephone 162 to agent's PC 161 will enable both IP and PSTN calls to be placed by the agent without the special wiring needed for interactive monitoring. The connection described above accomplishes this dual capability by the integration of a telephone receiver to a sound card and modem card on the PC. There is also a multitude of other ways, how this can be achieved such as PC-speakerphone, sound/modem card combos etc.

Therefore, in an embodiment wherein interactive monitoring as previously described is not practiced, then any serial cable as known in the art that will connect the receiver of the telephone to the sound and modem cards available on the PC will be sufficient for the practice of the present invention. There are, as well, other methods known in the art for creating a bridge between an agent's phone such as agent's telephone 162 and a PC's sound and modem cards thus enabling a single user interface that will allow both IP and normal telephone calls to be handled.

Agent station 170 is equipped identically to agent station 160, having a PC 171 connected to a LAN 152, an agent telephone 172 connected to telephony switch 120 via analog connection 174, and a modular cable 173 connecting agent's PC 171 to agent's telephone 172. Providing a connection such as modular cable 173 between a PSTN-connected telephone and a PC allows the telephone to be integrated with the modem and the sound card on the PC so that a single interface to the user is created as described above. Switching of calls from one media type to another may be accomplished utilizing the software of the present invention. In some embodiments of the invention switch 120 is not in the network, but a part of the customer premises equipment, wherein the switch is connected to the network via at least one wide-bandwidth trunk, and to a plurality of telephones in agent stations by lower-bandwidth ports identified n the local switch by destination numbers (DNs). In either case the cable connection between the telephone and the PC works the same for sharing audio.

LAN 152 is connected to a data server 153. Data server 153 in some embodiments stores information pertaining to a caller and/or other information required by agents to perform their functions. LAN 152 is also connected via a LAN server 175 to the Internet represented by cloud 181 via a digital connection 180. In some embodiments the Internet connection may be accomplished on processor 151 or other processor on the LAN providing suitable hardware and software as known in the art. LAN 152 is further connected to processor 151 running an instance of a computer-telephony integration application 114b known to the inventors as T-server. Processor 151 is connected via digital CTI connection 118 to telephony switch 120. CTI connection 118 connects processor 151 to other CTI equipment present at the public network level represented by PSTN cloud 100. The CTI-server (T-Server) is capable of monitoring activities of switch 120, and also of controlling functions of the switch.

Other equipment illustrated in this embodiment includes, but is not limited to, an intelligent peripheral (IP) 101, for obtaining customer information at the time of an incoming call, an adjunct processor 106, for such as load balancing of calls to call centers, a call distributor processor 108, and a processor 116 running an instance of T-server (T-S) 114 for communicating with T-Server 114b at the call center level, and an instance of a stat-server 112 for providing statistical information for such as predictive routing, and so on. It will be apparent to one with skill in the art that each separate processor illustrated could be in fact one multi-capable processor, and that none or all of the equipment and software may be present. The inventor chooses to include the aforementioned equipment solely to illustrate the "intelligent capabilities" of telephony network within which the present invention may be practiced.

CTI connection 118 allows routing routines and other executable commands to be executed from within call center 150 for the purpose of controlling telephony switch 120, as well as allowing digital information obtained at the time of the call to be passed to a receiving agent along with but ahead of the actual call.

A remote station 200 separate from call center 150 has a PC 202 connected to a telephone 201 via a modular cable 173 of the same sort and connectivity as described above for agent stations 160 and 170 in call center 150. The telephone-to-PC connection at remote station 200 serves the purpose of integrating telephone 201 with a modem and sound card on PC 202, thus forming a single user interface capable of handling both IP and conventional telephone calls. An instance of software according to an embodiment of the present invention (SW) is installed and executable on PC 202, and enables actual call switching.

In a preferred embodiment of the present invention, a client of the call center, using the equipment at station 200 initiates an Internet Protocol Network Telephony (IPNT) call using an Internet application installed and operable on PC 202. The client may interface to the computer using his/her telephone 201 by virtue of modular cable 173. Internet telephony applications using Transfer Control Protocol/Internet protocol (TCP/IP) are well known in the art and are available from several commercial vendors. The IP call is initiated from customer premises 200, via connection 203 to the Internet, which may be via a modem in PC 202 and appropriate Internet Service Provider (ISP) accounts and the like, as known in the art. The call is routed through Internet cloud 181 according to Internet protocol as also known in the art. Connection 203 may be of the form of analog or digital such as ISDN. The call goes, in this embodiment to processor 175, and is routed on LAN 152 to an agent at either of stations 160 and 170. For this example we will assume the IP call is answered by an agent at station 160.

As briefly discussed with reference to the background section, bandwidth is shared on the Internet, and must be available at a sufficient magnitude for the success of the IP call. Also, there are typically many routing points through which IP calls must pass. Available bandwidth can vary from one routing point to another. Therefore, software of the present invention (SW), of which there is an instance installed on PC 202, must monitor for available bandwidth along the entire path between PC 202 and finally processor 175. This may be accomplished by using existing techniques known in the art such as RSVP. RTP may be utilized as well provided that it is supported in the Internet phone application used by the customer at station 200.

SW has a pre-stored threshold for bandwidth needed for supporting IP calls from station 200. If bandwidth is found to be available at or above the preset threshold, then the IP call may proceed with acceptable quality between the agent at station 160 and the client at station 200.

In conventional art if there is not sufficient bandwidth available in one or more points along the routing path of the IP call, then the call would still be delivered, however the quality of communication may be substandard primarily because of lost packets of information. For example, voice may be choppy or unintelligible, video may be delayed, or not available at all, and so on.

A method according to the present invention allows for the client to be prompted via SW in the event that a desired quality of service cannot be reserved. A prompt, in this case, offers an option for the customer to switch the call over to another media type such as PSTN or ISDN. If a customer elects to switch, then his modem may dial the number through receiver modular cable 173, customer's telephone 200 and telephone channel 182 as call 104. The call is delivered to the agent at station 160 to which the IPNT call was connected. Once the conventional call is established the original IP call is terminated.

After the original call is terminated and the PSTN/ISDN call proceeds, SW in a preferred embodiment continues to ping the opposite terminal point for bandwidth, indicated by latency. If sufficient bandwidth (minimum latency) becomes again available via the Internet route, the call may be switched back to an IPNT call, and the PSTN/ISDN call may then be terminated.

There are various schemes that may be utilized to obtain various advantages over current art while practicing the present invention. For example, either or both of the agent's PC and the client's PC may be adapted via SW to switch calls between IPNT and conventional telephony channels.

An advantage to the client having control is that if there is not sufficient bandwidth available for an IPNT call, a PSTN/ISDN call can be initiated automatically (no manual dialing) by having the appropriate number stored in memory and perhaps coded for speed dial. Another advantage to the client having the power to switch a call is that in the event of a PSTN/ISDN call being stuck in a waiting queue, the customer may switch the call back to an IP call provided a desired quality of service becomes available. Also, in the event that a PSTN/ISDN call is required, a customer could have some control over the cost of the call by utilizing a least-cost routing application (not shown) that could be installed and configured with SW. For example, a least-cost routing application would determine which carrier is less expensive, etc.

An advantage to an agent operating within a call center of having the power to switch a call is that important calls may be salvaged in the event that a current IP transaction begins degrading. Switching to a PSTN/ISDN call could avoid the loss of a call and a customers business. Switching the call from PSTN/ISDN to IP may allow an agent to send video important to a customer, which can't be sent by the conventional telephony channels.

In another embodiment of the present invention, control may be reserved and automated with IPNT calls associated with call center 150 being monitored and converted (if needed) by an instance of SW installed on processor 151 and operating in concert with T-server 114b. In this case, the instance of SW running in processor 151 would monitor any IP transactions in progress at call center 150. SW in this embodiment is enhanced with a capability of monitoring a large number of calls that may be connected between agents and customers at any one time and will request T-server 114b control to establish alternative connections between agent's and clients. For example, at times that there is minimum traffic in the Internet network, more calls may be maintained as IP calls. At times where there is more congestion in the IP network, more calls would be crossed over to PSTN/ISDN calls, and so on. The IPNT calls that are converted to PSTN/ISDN may be established via sending a dialing command through CTI link 118 to telephony switch 120. Telephony switch 120 then dials the client's PSTN/ISDN number to establish a connection. Once a PSTN/ISDN connection is established, the original IPNT call is terminated as in previously described embodiments. However, SW continues monitoring the IPNT paths, and is adapted to either automatically switch calls back from PSTN/ISDN to IPNT if the desired QoS can be detected and reserved, or agents and/or clients may be alerted and requested to verify or authorize a transfer.

It will be apparent to one with skill in the art that the software (SW) according to embodiments of the present invention (SW) could be present at both agent stations and client locations, at agent stations only, at client locations only, or at a processor location having control over agent stations via LAN. Therefore, control could be tailored for each network.

Figure 2:
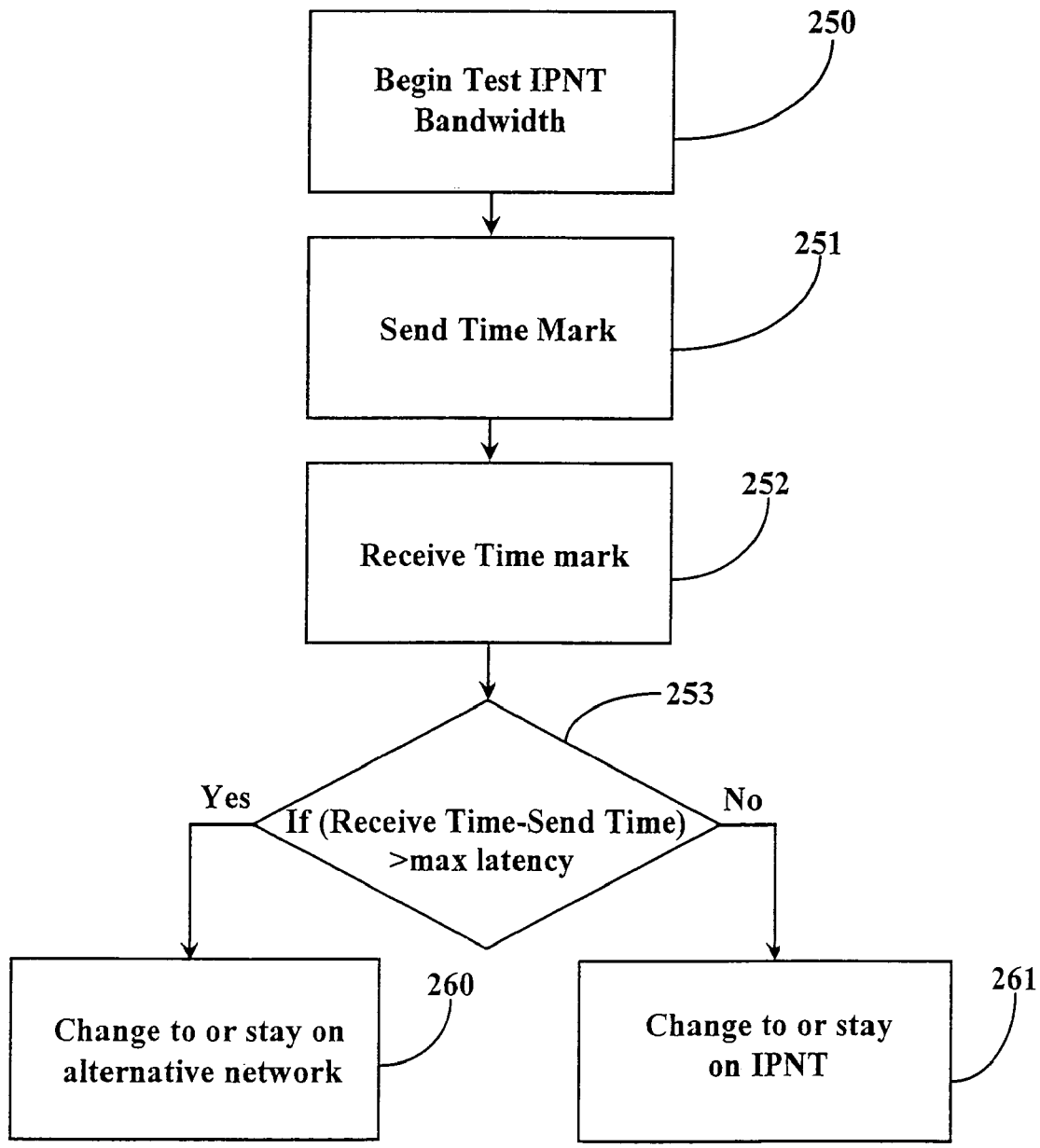
FIG. 2 is a software flow diagram illustrating detection and monitoring steps of the software of the present invention according to an embodiment of the present invention.

FIG. 2 is a flow diagram illustrating detection and monitoring steps of the software of the present invention according to a preferred embodiment. After an IPNT call has been initiated, SW begins motoring for available bandwidth over a WAN such as the Internet in step 250. In addition to using RSVP protocol or an equivalent to determine quality of service, a pinging technique, known in the art, is used to determine latency along the IPNT route. For example, a timing signal is sent at step 251. The signal is then received at step 252. If the time elapse between sending the signal in step 251 and receiving the signal in step 252 is determined to be greater than the maximum latency allowed in step 253, then the IPNT call is switched to an alternative media such as PSTN or ISDN in step 260. If the current transaction is PSTN/ISDN instead of IPNT, then a decision to stay with PSTN/ISDN is made at step 260. If however, the time elapse between sending a timing signal at 251 and receiving the time signal at step 252 is less than the maximum latency allowed, then a decision to stay with the IPNT call is implemented in step 261. If the current transaction is PSTN/ISDN instead of an IPNT call, then a decision to change to IPNT is implemented in step 261.

In most cases a the crossover of calls from PSTN/ISDN to IPNT and back again is seamless and transparent. This is accomplished by virtue of the single user interface formed by connecting a telephone such as customer's telephone 201 to a PC such as customer's PC 202 with modular cable 173, as in FIG. 1 and as described above, or by an equivalent technique. In another embodiment, a notification may pop up on a user's screen alerting him or her of a pending crossover and ask for permission to switch the call. In yet another embodiment, manual execution of call switching may be available to a user, and so on.

The process of matching appropriate PSTN/ISDN numbers to IPNT addresses can be accomplished automatically via accessing a database containing a directory of participating companies hosting call centers and clients. In another embodiment, updated IPNT addresses and telephone numbers could be available for users in the form of a download from the Internet.

Responsibility for telephone charges may be assigned to a company hosting a call center that is contacted by a customer. For example, in the event of a change from IPNT (no toll to customer) to a PSTN/ISDN (possible toll) call, a 1-800 number could be provided so that a crossover from IPNT to PSTN/ISDN or alternate media is free to a client. In another embodiment, a charge could be applied to a PSTN/ISDN call (dependent on particular carrier) and a client would be notified of the charge via pop-up menu. In this case a client may have an ability to refuse a call or utilize a least expensive routing application to choose a less expensive carrier and accept the call automatically.

It will be apparent to one with skill in the art that the method and apparatus of the present invention may be utilized on a WAN of a form other than the Internet without departing from the spirit and scope of the present invention, such as a large corporate WAN. It will also be apparent to one with skill in the art that the method and apparatus of the present invention may be practiced on a smaller scale than is illustrated in the call center embodiment of FIG. 1. For example, any number of individuals having an Internet connected PC, a telephone, and an apparatus capable of providing integration of the telephone receiver, PC sound card, and PC modem can use the software of the present invention for the purpose of switching calls from IPNT to PSTN/ISDN and back.

There are many possible embodiments through which the method and apparatus of the present invention may be practiced without departing from the spirit and scope of the present invention, many of which have already been described. For example, it will be apparent to those with skill in the art that a single user interface as described in embodiments above is not absolutely necessary for practicing the present invention. As long as the parties to a call each have a PC connected to a WAN and a telephone connected to an intelligent telephony network, such as PSTN/ISDN, the invention may be practiced in some form by means of software at one or both PC stations used by the parties to a call. As another example, it will be apparent to those with skill in the art that the features of the invention apply to video calls as well as to IPNT calls, as such calls are digital in nature, and have minimum bandwidth requirements just as do IPNT calls. The spirit and scope of the present invention is limited only by the claims that follow.

What is claimed is:

1. A method for establishing communication between a caller and an agent at a station offering a plurality of media type, including at least public switch network telephony (PSTN) calls, digital network telephony (DNT), and emails, comprising steps of:

(a) coupling the agent station to a digital data network and to a PSTN network allowing DNT calls and other media protocols to be employed;

(b) monitoring bandwidth on an existing DNT call;

(c) comparing available bandwidth to a prestored threshold value;

(d) in the event that available bandwidth is less than the prestored threshold value, informing at least one of the participants to the call of an impending switch from DNT to another media type; and (e) switching communication from the DNT call to the other media type.

2. The method of claim 1 wherein, in step (b) bandwidth is monitored by determining latency between two points, and in step (c) the prestored threshold value is a latency time value.

3. The method of claim 1 further comprising a step (e) for continuing to monitor bandwidth for the communication after switching, and restoring the DNT call in the event that available bandwidth again is equal to or exceeds the prestored threshold value.

4. The method of claim 3 wherein, before switching the communication back to DNT, at least one of the participants to the communication is informed of the impending switch.

5. The method of claim 4 wherein, in addition to notifying at least one of the participants of an impending switch, the party notified is also offered an opportunity to ratify the impending switch, a reply to the offer being required for the switch to proceed.

* * * * *